US005406705A

United States Patent [19]

Kildune

[11] Patent Number: 5,406,705

[45] Date of Patent: Apr. 18, 1995

[54] METHOD OF PRODUCING AN EMBOSSING CYLINDER

[75] Inventor: Joseph S. Kildune, Salem, N.H.

[73] Assignee: GenCorp Inc., Fairlawn, Ohio

[21] Appl. No.: 190,970

[22] Filed: Feb. 3, 1994

[51] Int. Cl.$^{6}$ .......... B23D 15/00

[52] U.S. Cl. .......... 29/895.32; 29/895.23; 492/30

[58] Field of Search .......... 29/895.21, 895.211, 29/895.23, 895.32; 492/30, 37

[56] References Cited

U.S. PATENT DOCUMENTS

| | | | |
|---|---|---|---|
| 1,741,698 | 12/1929 | Hampson | 492/37 |
| 1,813,669 | 7/1931 | Hastings | 29/895.32 |
| 2,453,404 | 11/1948 | Bohlman et al. | 492/37 |
| 2,662,002 | 12/1953 | Sunderhauf et al. | 492/30 |
| 3,257,251 | 6/1966 | Lewis et al. . | |
| 3,309,984 | 3/1967 | McKay . | |
| 3,380,864 | 4/1968 | Broderick . | |
| 3,775,261 | 11/1973 | Reith . | |
| 3,893,975 | 7/1975 | Christoph et al. . | |
| 4,159,677 | 7/1979 | Smith . | |
| 4,189,815 | 2/1980 | Seelenbinder | 492/37 |
| 4,571,798 | 2/1986 | Adams | 492/37 |
| 5,071,083 | 12/1991 | Tubota et al. | 492/37 |
| 5,266,257 | 11/1993 | Kildune | 29/895.32 |

FOREIGN PATENT DOCUMENTS

| | | | |
|---|---|---|---|
| 0696068 | 8/1953 | United Kingdom | 29/895.32 |

OTHER PUBLICATIONS

*The Wall Street Journal*, Jun. 10, 1993 (p. 1).

*Primary Examiner*—Irene Cuda
*Attorney, Agent, or Firm*—Robert F. Rywalski; John C. Smith, Jr.

[57] ABSTRACT

A method of producing an embossing cylinder having a predetermined embossed pattern thereon by applying a screen having a pattern inscribed therein to the surface of the cylinder, applying a hardenable material over the screen and pressing the hardenable material through the screen onto the surface of the cylinder, and removing the screen and allowing the hardenable material to harden to form an embossed pattern of hardened material on the surface of the cylinder.

24 Claims, 2 Drawing Sheets

METHOD OF PRODUCING AN EMBOSSING CYLINDER

BACKGROUND OF THE INVENTION

1. Field of the Invention

This invention is directed to a method of producing an embossing cylinder having a predetermined pattern thereon for embossing sheet materials such as wall coverings. The cylinder with the embossing pattern thereon is produced by applying a mesh or screen having the predetermined pattern inscribed therein to a cylinder, applying a hardenable material over the screen, allowing the material to set, removing the screen to expose the cylinder with the embossing pattern thereon and allowing the material to fully cure or harden.

2. Description of Prior Art

Various techniques have been proposed for the production of embossing cylinders. U.S. Pat. No. 3,893,795 to Nauta discloses an embossing cylinder with a composite coating of a synthetic plastic in which the surface layer has an area of greater resilience than the other areas. The layers of coating are formed on the cylinder by spraying, dipping or other means. Preferably, the inner layer is formed by providing a mold around the cylinder core and introducing a fluid resin into the space between the core and the wall of the mold which is hardened. Portions of the formed layer on the cylinder core are carved out to produce the desired surface pattern and a second layer of resin is subsequently deposited on the carved first layer.

U.S. Pat. No. 3,257,251 to Lewis et al discloses a method of preparing an embossing matrix with a stucco pattern. The method includes an etching step to produce the embossing pattern.

U.S. Pat. No. 3,380,864 to Broderick discloses a method of preparing lenticular embossing cylinders by coating the cylinders with an acid resist followed by spray-coating with a second acid resist.

U.S. Pat. No. 3,309,984 to McKay discloses a method of preparing embossing cylinders with a design thereon. The cylinders are prepared by a method that includes copper plating and etching steps.

U.S. Pat. No. 3,775,261 to Reith discloses a method of producing an embossing cylinder that includes the steps of coating with a photographic emulsion and electroplating.

U.S. Pat. No. 4,159,677 to Smith discloses the concept of using an epoxy to attach embossing segments to the surface of a cylinder.

An object of the present invention is to provide embossing cylinders for embossing sheet material to provide a visual pattern effect wherein the embossing pattern on the cylinders is composed of a hardened material.

A further object of the invention is to provide a method for preparing embossing cylinders having a predetermined pattern thereon which can be produced easily and economically.

A still further object of the invention is to provide a method using a screen to form an embossing pattern on a cylinder.

A further object of the invention is to provide a method using a screen to form an embossing pattern which is a continuous, uninterrupted pattern about the entire circumference of the cylinder.

A still further object of the invention is to provide a method using a screen to form an embossing pattern which will produce a repeat, embossed, continuous, uninterrupted pattern in sheet material.

SUMMARY OF THE INVENTION

It has now been found that the foregoing objects can be readily attained by a multi-step method of producing an embossing cylinder having a predetermined embossing pattern thereon. The pattern is transferred from a mesh or screen having a predetermined pattern inscribed therein onto the surface of a cylinder by applying the screen to the cylinder surface and then applying a hardenable material over the screen. The hardenable material is pressed through selected areas of the screen as determined by the pattern inscribed therein and onto the surface of the cylinder to form an embossing pattern on the cylinder. After the hardenable material has at least partially set, the screen is removed to expose the cylinder with the embossing pattern thereon. The hardenable material is allowed to fully cure. The screening technique provides a repeat embossed design which is continuous over the entire circumferential surface of the cylinder.

DESCRIPTION OF THE PREFERRED EMBODIMENTS

The mesh or screen having the desired pattern inscribed therein is prepared by any well known process such as a conventional photographic technique. The screen itself is a mesh which may be made of strong silk gauze; synthetic gauzes such as polyester, nylon or tergal; wire gauze such as phosphor bronze, stainless steel or nickel; or combinations thereof, such as nylon-copper or nylon-bronze. The screen may have a mesh size ranging from about 90 to 40 mesh, the preferred range being about 80 to 50 mesh. One example of a preferred screen is a polyester screen No. P CAP Twill Weave Mesh, marketed by Magnacure Co., which has a thickness of about 10 mil and a mesh of about 60.

The design to be reproduced is transferred to the screen by a direct or indirect photomechanical process. In the direct photomechanical process, the screen is covered with a photosensitive layer and then exposed under a positive. The indirect photomechanical process requires exposure under a positive of a photosensitive film which is then bonded to the screen. The mesh in the positive areas of the screen is closed, and therefore impervious, while the mesh in the negative areas is open, and therefore pervious. A preferred photosensitive layer or film is a diazo photosensitive emulsion marketed by Magnacure Co.

The cylinder upon which the embossing pattern is applied is a conventional metal cylinder, the cylindrical surface of which is sandblasted or milled to provide a smooth uniform surface but with a bite to insure adhesion of the hardened embossing material.

FIGS. 1–5 graphically show the steps of the method of producing the embossing cylinder with a predetermined, continuous, repeat, embossed pattern thereon.

Figure 1:
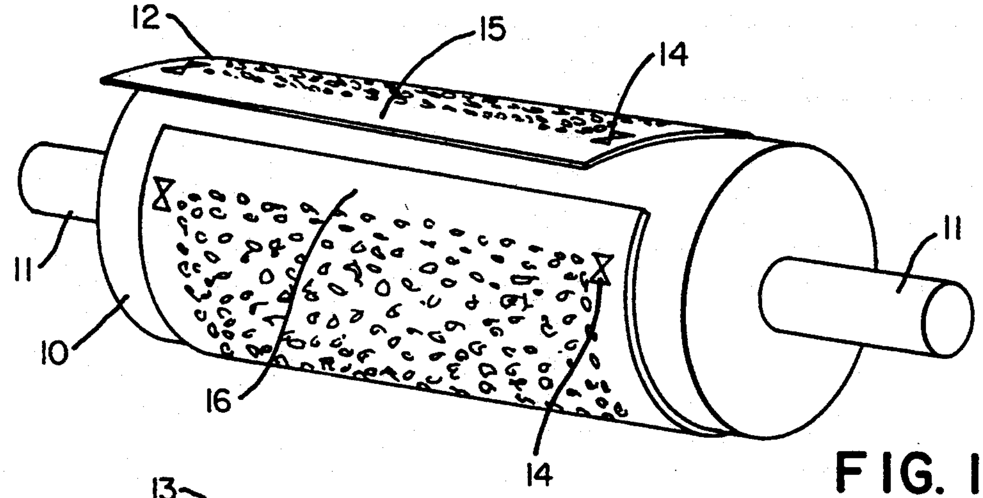
FIG. 1 is a top perspective view of a cylinder showing the method of applying the patterned mesh or screen thereto.
Figure 2:
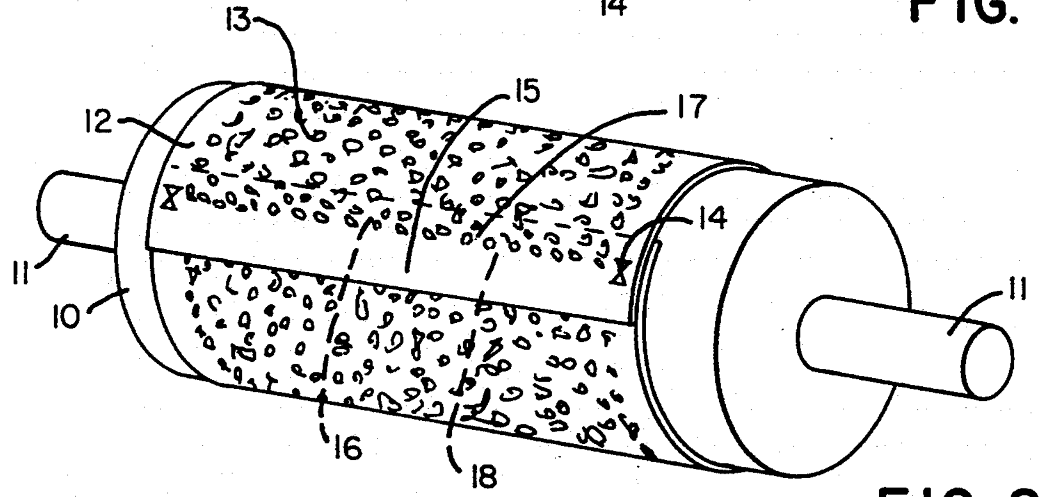
FIG. 2 is a top perspective view showing the patterned screen applied to the cylinder.

The cylinder 10 includes a shaft 11 projecting from opposite ends thereof for rotatably securing the cylinder in place in a conventional printer or other equipment. The mesh or screen 12 with the desired pattern inscribed therein is shown positioned and tightly wrapped about the surface of the cylinder as shown in FIGS. 1 and 2. The opposite ends of the screen overlap, the overlapping areas of the screen being designated 15 and 16, respectively. The pattern 13 is inscribed in the screen 12 and extends into portions of both overlapping areas 15 and 16 of the screen such that, with the screen in place on the cylinder, the edge 17 of the pattern in one overlapping area 15 abuts the opposite edge 18 of the pattern in the other overlapping area 16, as shown in FIG. 2, such that the pattern itself is a repeat, continuous pattern about the entire circumference of the cylinder. The abutting edges 17 and 18 of the pattern preferably should conform to the pattern itself to assure that the embossing pattern formed on the cylinder is continuous and does not overlap or have a gap which can be detected. Thus, the abutting edges 17 and 18 may form a straight line, as shown, or an irregular line, depending on the pattern.

Preferably, the pattern 12 should not extend into margin areas at opposite sides of the screen. Registration marks 14, designated "X", are located in the margin areas at opposite ends of the overlapping areas 15 and 16. When the screen 12 is wrapped tightly about the cylinder 10, the registration marks on the overlapping areas 15 are in registration with the respective registration marks on the overlapping area 16 and with corresponding registration marks "X" (not shown) on the surface of the cylinder 10.

Figure 3:
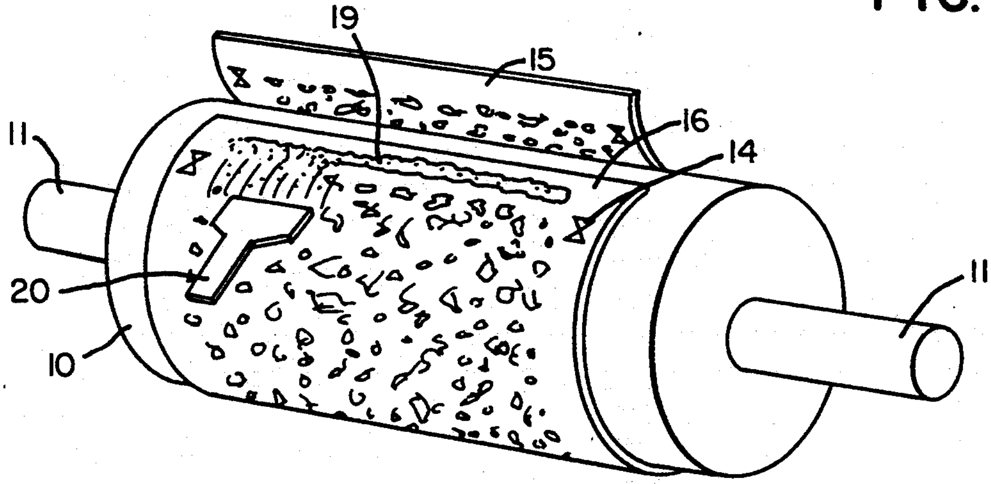
FIG. 3 is a top perspective view showing the application of hardenable material to a first portion of the patterned screen.

Referring to FIG. 3, the overlapping area 15 of the screen is raised sufficiently to expose the overlapping area 16 after which a supply of hardenable material 19, which has a paste-like or thixotropic consistency, is applied to the exposed overlapping portion. The hardenable material is then spread uniformly over approximately one-half the length of the screen and simultaneously pressed through the pervious areas of the screen onto the surface of the cylinder by means of a spatula 20. Alternatively, a doctor blade extending across the entire width of the screen may be used for spreading the hardenable material and pressing it through the screen.

Figure 4:
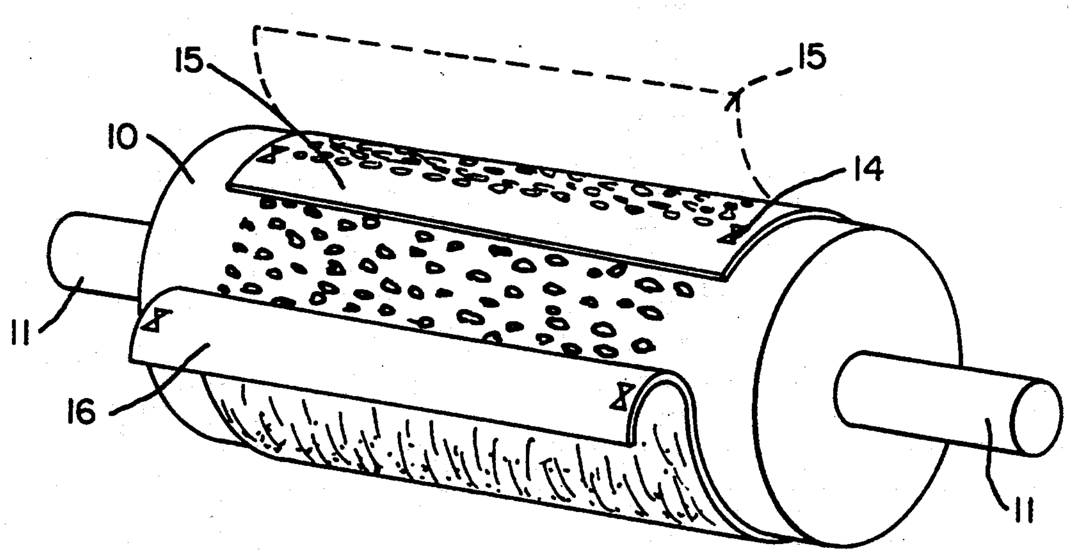
FIG. 4 is a top perspective view showing the raising of one end of the screen from the surface of the cylinder and the lowering of the opposite end of the screen against the surface of the cylinder.
Figure 5:
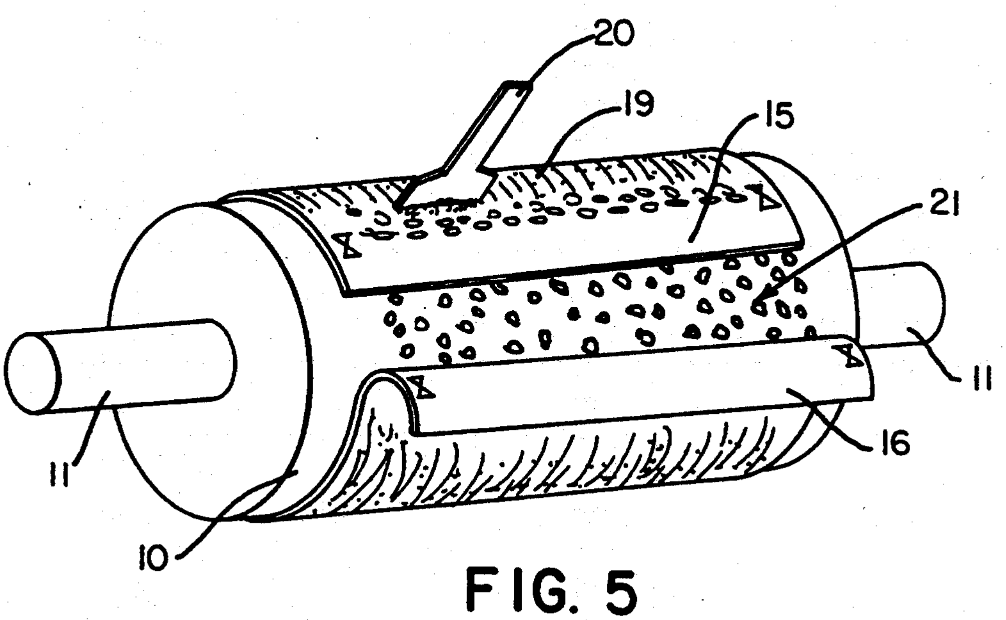
FIG. 5 is a top perspective view showing the application of additional hardenable material to the remaining portion of the screen.

Referring to FIG. 4, the overlapping area 16 of the screen 12 is then raised from the cylinder surface and the previously raised overlapping area 15 (shown in dotted lines) of the screen is lowered against the surface of the cylinder. Additional hardenable material 19 is then applied to the overlapping area 15 of the screen 12, and the spatula 20 or a doctor blade is then used to spread the hardenable material uniformly about the other approximately half the length of the screen and simultaneously press it through the pervious areas of the screen onto the surface of the cylinder as shown in FIG. 5.

After the hardenable material has set for a short time, the screen is removed from the surface of the cylinder and the hardenable material is allowed to fully cure and harden. An embossed, continuous, repeat pattern 21 has been formed on the surface of the cylinder. The pattern 21 on the cylinder is continuous and without a gap due to the fact that the opposite edges 17 and 18 of the pattern in the screen were in abutting relationship. The embossing cylinder may then be used to continuously emboss sheet material using conventional techniques well known in the printing industry.

The material to be deposited through the screen onto the cylindrical surface of the cylinder must be hardenable. Suitable hardenable materials that can be used for casting an embossing cylinder are numerous. Some of the potential materials are various thermosetting epoxy resins, unsaturated polyesters, vinyl ester resins and cyanate resins. Other possibilities may be castable polyurethanes, polyureas and nylon.

Epoxy resins generally have two components, resin and hardener, which react after mixing to form a hard solid. The most typical resins are the diglycidyl ethers of bisphenol A which are made by reacting bisphenol A with epichlorohydrin. Other commonly used resins are the epoxy novolacs, diglycidyl aniline, the tetraglycidyl adduct of diaminodiphenylenemethane and various cycloaliphatic epoxies. These epoxy resins are available from various manufacturers such as Shell Oil Co. (Epon resins) and Dow Chemical (DER resins).

Several catalysts or hardeners can be used to react with the epoxy resins to form hard materials. The hardeners include aliphatic and aromatic amines, polyamidoamines, polyamides, anhydrides, polymercaptains and dicyandiamide. Suitable catalysts that will cure epoxy resins include Lewis acids, Lewis acid amine complexes and tertiary amines. A wide variety of hardeners and catalysts are available from Pacific Anchor Co.

Epoxy resins can be further compounded with various fillers, reactive diluents and mold release agents so as to tailor properties and provide desired processing characteristics. Fully formulated systems are available from various manufacturers for different applications.

A desirable material for casting embossing rolls is ESR-217-AL which is marketed by Ad-Tech Industrial Plastic Systems, 8915 Shepard Street, Charlotte, Mich. 48813. The filler comprises (% by weight):

| | |
|---|---|
| Epoxy resin | <30% |
| Aluminum powder | >60% |
| Amorphous fused silica | <2% |

The hardener comprises (% by weight):

| | |
|---|---|
| An aromatic amine blend | <45% |
| Aliphatic amine | <25% |
| 1-methyl imidazole | <10% |
| Amorphous hydrated silica | <20% |

The filler and hardener are mixed (100 parts by weight of filler to 9 parts by weight of hardener) to form a thixotropic mixture having a working life of 50–60 minutes and a cure time at room temperature of 2–3 hours. The cure time can be accelerated by the application of external heat. The cured ESR-217-AL epoxy resin has the following physical properties:

| | |
|---|---|
| Specific gravity | 1.76 gm/cc |

-continued

| | | |
|---|---|---|
| Density | 0.061 | lbs/cu in. |
| Tensile strength | 6000 | psi |
| Compressive strength | 15,900 | psi |
| Flexural strength | 8400 | psi |
| Hardness | 85-90 | Shore D |

Thermosetting unsaturated polyester resins are prepared by mixing a polyester with a reactive monomer which mixture is cured by a peroxide initiated free radical crosslinking reaction. The unsaturated polyesters are condensation products of glycol with a dicarboxylic acid or anhydride. Common glycols utilized to make such polyesters include ethylene glycol; 1,2-propylene glycol; 1,3-butylene glycol; diethylene glycol; dipropylene glycol; neopentyl glycol; and 1,4-butylene glycol. Maleic acid, fumaric acid or maleic anhydride are the main unsaturated acids and anhydrides used in making unsaturated polyesters. These can be used with lesser amounts of saturated diacids or anhydrides such as adipic acid, isophthalic acid, phthalic anhydride, glutaric acid and succinic acid.

The most commonly used reactive monomer for curing unsaturated polyesters is styrene. In addition, other monomers can be used including vinyl toluene, divinyl benzene, methyl methacrylate and diallyl phthalate. There are many peroxides suitable for initiating cure of unsaturated polyesters. Some useful peroxides include benzoyl peroxide, dilauroyl peroxide, t-butyl peroxide and methyl ethyl ketone peroxide. Unsaturated polyesters can be formulated with various ingredients such as fillers, mold release agents and low shrink additives for different applications.

Another system useful for casting embossing rolls is Filler No. 17, a high heat resistant unsaturated polyester, which is also marketed by Ad-Tech Industrial Plastic Systems. Filler No. 17 is composed of a filler composition and a cream hardener which are mixed together to form a smooth workable paste which cures readily and bonds strongly to the metal surface of the cylinder. The filler comprises (% by weight):

| | |
|---|---|
| Unsaturated polyester resin | 30-50% |
| Vinyl toluene monomer | 5-15% |
| Magnesium silicate (talcum) | 40-60% |
| Barium sulfate (barytes) | 2-8% |

The cream hardener, which is mixed with the filler, comprises (% by weight):

| | |
|---|---|
| Benzoyl peroxide | 50% |
| Butyl benzyl phthalate | >35% |

The filler and hardener are mixed together (50 parts by weight or volume of filler to one part by weight or volume of hardener) to form a smooth, creamy, thick paste having a workable life of about 5 minutes. Its finish schedule is about 15 minutes. The cured material has a Shore D hardness of about 90. The setting time at room temperature is normally about 5 to 10 minutes, though this time may be adjusted by increasing or decreasing the hardener level. Full hardness is achieved in about 15 to 20 minutes to form a high heat-resistant rigid polyester resin.

Vinyl ester resins are potentially useful thermosetting materials for casting embossing rolls. Vinyl ester resins have terminal acrylate unsaturation and are made by reaction of an epoxy resin with acrylic or methacrylic acid. Vinyl ester resins are also cured via a peroxide initiated crosslinking reaction with a reactive monomer-like styrene or vinyl toluene. The same types of catalysts used to cure unsaturated polyester compositions are used to cure the vinyl esters. Vinyl ester resins are commercially available from Dow Chemical Co. (Derekane resins) which can be further compounded with fillers and initiators for specific applications.

Cyanate resins are recently developed materials for castable applications. They form hard tough solids with good high temperature resistance. A commercially available product is AROCY which can be obtained from Ciba-Geigy Corp.

The thickness of the embossed pattern on the cylinder is determined primarily by the thickness of the screen. Thus, if the screen has a thickness of 10 mil, the embossed pattern will have approximately the same thickness. Though the screen may be any desired thickness, depending upon the desired thickness of the embossed pattern, a screen thickness of 1 to 10 mils is preferred. The quality of the embossed pattern obtained with screens of greater thickness tends to be less satisfactory.

Embossed patterns having a thickness greater than 10 mils are preferably obtained by repeating the process described above and shown in FIGS. 1-5 using the same screen 12. After the hardenable material 19 has fully cured on the surface of the cylinder, the screen 12 may again be wrapped around the cylinder 10 with the embossed, continuous, repeat pattern 21 formed thereon. The screen is positioned as shown in FIG. 2 with the registration marks 14 in registry with the corresponding registration marks on the surface of the cylinder. Then the process of applying further hardenable material 19, as shown in FIGS. 3 to 5, is repeated to form a second layer of hardenable material in the same continuous, repeat pattern in registry with the previously applied continuous repeat pattern. The screen is again removed from the cylinder, and the additional hardenable material is allowed to fully cure, forming an embossed, continuous, repeat pattern which is approximately twice as thick as the original pattern formed on the surface of the cylinder. This process may be repeated several times if necessary to obtain the desired thickness for the embossed pattern on the embossing cylinder.

While there have been shown, described and pointed out the fundamental novel features of the invention as applied to the preferred embodiments, it will be understood that various omissions, substitutions and changes of the form and details of the method may be made by those skilled in the art without departing from the essence and scope of the invention.

I claim:

1. A method for producing an embossing cylinder having a predetermined embossed pattern on its cylindrical surface, comprising the steps of:

(a) applying a mesh or screen, having said predetermined pattern therein in the form of pervious and impervious areas in said screen, to the cylindrical surface of a cylinder;

(b) applying a hardenable filler material over said screen and pressing said hardenable material through said pervious areas of said screen onto said cylindrical surface of said cylinder to form said predetermined pattern in embossed form on said cylindrical surface of said cylinder; and (c) removing said screen from said cylindrical surface of said cylinder and allowing said hardenable material to harden;

(d) whereby a predetermined embossed pattern of said hardened material is formed on said cylindrical surface of said cylinder.

2. The method according to claim 1 wherein said surface of said cylinder is pretreated by sandblasting or milling to improve adhesion of said hardenable material thereto.

3. The method according to claim 1 wherein said hardenable material comprises a thermosetting epoxy resin.

4. The method according to claim 3 wherein said hardenable material comprises a mixture of a thermosetting epoxy resin and a hardener.

5. The method according to claim 1 wherein said hardenble material comprises a high-temperature aluminum epoxy filler material.

6. The method according to claim 1 wherein said hardenable material comprises a thermosetting unsaturated polyester resin.

7. The method according to claim 6 wherein said hardenable material comprises a mixture of a thermosetting unsaturated polyester resin and a hardener.

8. The method according to claim 1 wherein said screen has a mesh size between about 90 and 40 mesh.

9. The method according to claim 8 wherein said screen has a mesh size between about 80 and 50 mesh.

10. The method according to claim 1 wherein said screen has a thickness between about 1 and 10 mils.

11. The method according to claim 10 wherein said screen has a thickness of about 10 mils.

12. The method according to claim 1 comprising the further steps of:

(a) reapplying said mesh or screen to said cylindrical surface of said cylinder having said predetermined embossed pattern of hardened material formed thereon, said pattern in said screen being in registry with the previously formed embossed pattern on said surface of said cylinder;

(b) applying further hardenable material over said screen such that said hardenable material passes through said screen onto said previously formed embossed pattern of hardened material on said surface of said cylinder to form a layer of said hardenable filler material in the form of said pattern on said previously formed embossed pattern on said surface of said cylinder; and (c) removing said screen from cylinder and allowing said hardenable material to harden;

(d) whereby the thickness of said embossed pattern of said hardened material on said cylindrical surface of said cylinder is increased.

13. A method for producing an embossing cylinder having a predetermined embossed pattern on its cylindrical surface comprising the steps of:

(a) applying a mesh or screen, having said predetermined pattern therein in the form of pervious and impervious areas in said screen and having a length greater than the circumference of said cylinder and first and second ends at opposite ends thereof, to the cylindrical surface of a cylinder, whereby said screen surrounds said cylindrical surface and a second overlapping area of said screen adjacent said second end thereof overlaps a first overlapping area of said screen adjacent said first end thereof, said second overlapping area of said screen being spaced from said first overlapping area such that said first overlapping area is exposed;

(b) applying a hardenable filler material over a first portion of said screen, including said first overlapping area, extending from adjacent said first end thereof towards said second end and pressing said hardenable material through said pervious areas of said first portion of said screen onto said cylindrical surface of said cylinder to form a first portion of said predetermined pattern in embossed form on said cylindrical surface of said cylinder;

(c) lifting said first overlapping area of said screen from said cylindrical surface of said cylinder and placing said second overlapping area of said screen against said cylindrical surface of said cylinder, said first overlapping area of said screen being spaced from said second overlapping area such that said second overlapping area is exposed;

(d) applying said hardenable filler material over a second portion of said screen, including said second overlapping area, extending from adjacent said second end thereof to said first portion, and pressing said hardenable material through said pervious areas of said second portion of said screen onto said cylindrical surface of said cylinder to form the balance of said predetermined pattern in embossed form on said cylindrical surface of said cylinder; and (e) removing said screen from said cylindrical surface of said cylinder and allowing said hardenable material to harden;

(f) whereby a predetermined embossed pattern of said hardened material is formed on said cylindrical surface of said cylinder.

14. The method according to claim 13 wherein said surface of said cylinder is pretreated by sandblasting or milling to improve adhesion of said hardenable material thereto.

15. The method according to claim 13 wherein said hardenable material comprises a thermosetting epoxy resin.

16. The method according to claim 15 wherein said hardenable material comprises a mixture of a thermosetting epoxy resin and a hardener.

17. The method according to claim 13 wherein said hardenable material comprises a high-temperature aluminum epoxy filler material.

18. The method according to claim 13 wherein said hardenable material comprises a thermosetting unsaturated polyester resin.

19. The method according to claim 18 wherein said hardenable material comprises a mixture of a thermosetting unsaturated polyester resin and a hardener.

20. The method according to claim 13 wherein said screen has a mesh size between about 90 and 40 mesh.

21. The method according to claim 20 wherein said screen has a mesh size between about 80 and 50 mesh.

22. The method according to claim 13 wherein said screen has a thickness between about 1 and 10 mils.

23. The method according to claim 10 wherein said screen has a thickness of about 10 mils.

24. The method according to claim 13 comprising the further steps of:

(a) reapplying said mesh or screen to said cylindrical surface of said cylinder having said predetermined embossed pattern of hardened material formed thereon, said pattern in said screen being in registry with the previously formed embossed pattern on said surface of said cylinder and said second overlapping area of said screen overlapping said first overlapping area of said screen, said second overlapping area being spaced from said first overlapping area such that said first overlapping area is exposed;

(b) applying further hardenable material over said first portion of said screen and pressing said hardenable material through said pervious areas of said first portion of said screen onto said previously formed embossed pattern of hardened material on said surface of said cylinder to form a first portion of a layer of said hardenable material in the form of said pattern on a portion of said previously formed embossed pattern on said surface of said cylinder;

(c) lifting said first overlapping area of said screen from said previously formed embossed pattern on said surface of said cylinder and placing said second overlapping area of said screen against said previously formed embossed pattern on said surface of said cylinder, said first overlapping area of said screen being spaced from said second overlapping area such that said second overlapping area is exposed;

(d) applying further hardenable material over said second portion of said screen and pressing said hardenable material through said pervious areas of said second portion of said screen onto said previously formed embossed pattern on said surface of said cylinder to form the balance of said layer of said hardenable material in the form of said pattern on the balance of said previously formed embossed pattern on said surface of said cylinder; and (e) removing said screen from said previously formed embossed pattern on said surface of said cylinder and allowing the additional layer of hardenable material to harden;

(f) whereby the thickness of said embossed pattern of said hardened material on said cylindrical surface of said cylinder is increased.

* * * * *